United States Patent [19]
Hashimoto et al.

[11] Patent Number: 5,670,746
[45] Date of Patent: Sep. 23, 1997

[54] STRUCTURE OF ELECTRODE UNIT

[75] Inventors: Shigeharu Hashimoto, Okazaki; Tadato Ito, Nagoya, both of Japan

[73] Assignee: NGK Insulators, Ltd., Japan

[21] Appl. No.: 408,776

[22] Filed: Mar. 23, 1995

[30] Foreign Application Priority Data

Jul. 29, 1994 [JP] Japan .................. 6-178587

[51] Int. Cl.$^6$ ........................................ H05K 7/00
[52] U.S. Cl. ................ 174/65 R; 422/174; 219/541
[58] Field of Search ..................... 60/300; 422/174, 422/180; 174/65 R; 219/541; 274/65 SJ, 151; 291/178

[56] References Cited

U.S. PATENT DOCUMENTS

| | | | |
|---|---|---|---|
| 4,507,521 | 3/1985 | Goellner | 174/151 |
| 5,070,694 | 12/1991 | Whittenberger | 60/300 |
| 5,227,587 | 7/1993 | Paterek | 174/152 GM |
| 5,238,650 | 8/1993 | Sheller et al. | 422/174 |
| 5,318,756 | 6/1994 | Sheller et al. | 422/174 |
| 5,436,216 | 7/1995 | Toyao et al. | 502/439 |

FOREIGN PATENT DOCUMENTS

0618353  10/1994  European Pat. Off. .

*Primary Examiner*—Hyung S Sough
*Assistant Examiner*—Joseph Waks
*Attorney, Agent, or Firm*—Parkhurst, Wendel & Burr, LLP

[57] ABSTRACT

A structure of an electrode unit for applying electricity to a conductible substance (4) installed in a metallic housing (2) has a metallic electrode (6) connected to a portion of the conductible substance (4), an insulating member (8, 8') positioned between the electrode (6) and the metallic housing (2), and a metallic sealing material (10,10') to be transformed by fastening a nut so as to secure sealability between the electrode (6) and the insulating member (8) and between the metallic housing (2) and the insulating member (8). The structure of an electrode unit is excellent in an insulating property and a gas sealability between the metallic housing (2) and electrode (6) and therefore has high reliability.

16 Claims, 8 Drawing Sheets

STRUCTURE OF ELECTRODE UNIT

BACKGROUND OF THE INVENTION AND RELATED ART STATEMENT

The present invention relates to the structure of an electrode unit to apply electricity to a conductible substance installed in a metallic housing.

It has been known that an electrical heater is used for raising a temperature of a catalyst up to a working temperature in a catalytic converter used for purifying an exhaust gas from automobiles. The electrical heater usually comprises a metallic honeycomb structure installed in a metallic housing (i.e. a can or the like) and an electrode for applying electricity to the honeycomb structure.

Figure 7:
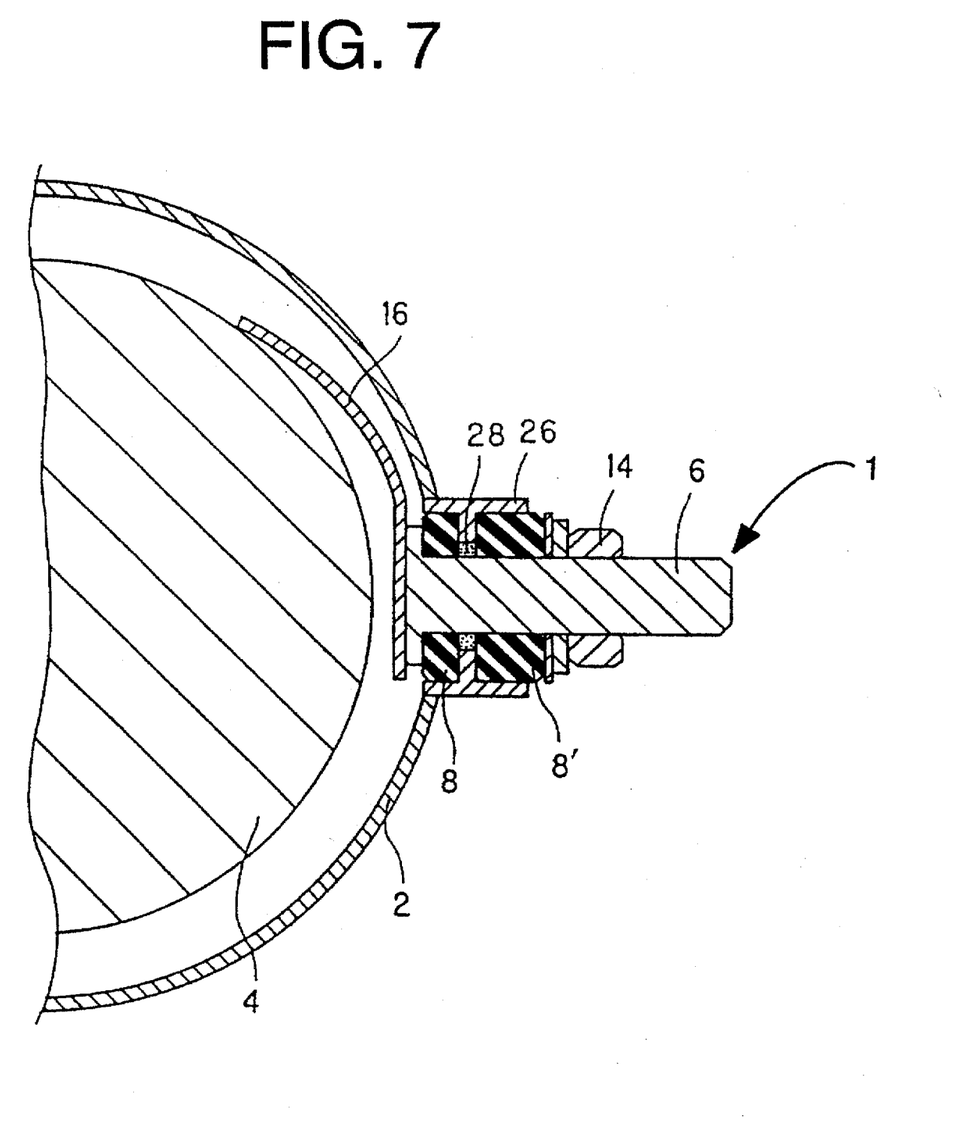
FIG. 7 is a partial explanatory view showing an embodiment of a conventional structure of an electrode unit.

As such a structure, the electrode unit shown in FIG. 7 has conventionally been proposed. In FIG. 7, to an electrode 6 are fixed insulating members 8, 8' and a holder 26 for fixing the insulating members between a metallic housing (can) 2 and the electrode 6 by fastening a nut 14 via a washer. This is inserted into a hole in the metallic housing 2 and welded. The electrode 6 is connected to a part of the honeycomb structure 4 by means of a metallic connecting member 16 in the metallic housing 2. In order to prevent gas from leaking and thus maintain gas sealability, cement sealing material 28 is interposed between the electrode 6 and holder 26.

This structure of an electrode unit needs to have the insulating property between the metallic housing and the electrode ensured provide a good gas seal between those components. When a cement sealing material is employed as the conventional structure of an electrode unit mentioned above, repeated heat cycling causes cracks in the cement sealing material because of the difference in thermal expansion between the cement sealing material and the metallic member, and thus the gas sealability deteriorates. Another problem is that because of the hygroscopicity which cement possesses, insulating resistance deteriorates by water absorbed in the cement when water is splashed over that portion or when humidity is high.

An object of the present invention is to solve the aforementioned conventional problems and to provide a structure of an electrode unit having an excellent insulating property between the electrode and the metallic housing installing the conductible substance, an excellent gas sealability, and a high reliability.

SUMMARY OF THE INVENTION

According to the first aspect of the present invention, there is provided a structure of an electrode unit for applying electricity to a conductible substance installed in a metallic housing, the structure comprising: a metallic electrode connected to a portion of the conductible substance; an insulating member positioned between the electrode and the metallic housing; and a metallic sealing material positioned and securing sealability between the electrode and the insulating member and between the metallic housing and the insulating member.

According to the second aspect of the present invention, there is further provided a structure of an electrode unit for applying electricity to a conductible substance installed in a metallic housing, the structure comprising: a metallic electrode connected to a portion of the conductible substance; a metallic housing coated with ceramic in the portion near the electrode; and a metallic sealing material positioned and securing sealability between the metallic housing and the electrode.

According to the third aspect of the present invention, there is furthermore provided a structure of an electrode unit for applying electricity to a conductible substance installed in a metallic housing, the structure comprising: a metallic electrode coated with ceramic in the portion near the metallic housing, the electrode being connected to a portion of the conductible substance; a metallic housing; and a metallic sealing material positioned and securing sealability between the metallic housing and the electrode coated with ceramic.

The present invention is constituted as above. In the first aspect of the invention, the insulating member ensures a good insulating seal between the electrode and the metallic housing. At the same time, gas sealability is maintained by the metallic sealing material between the electrode and the insulating member and between the metallic housing and the insulating member.

In the second aspect of the invention, a good insulating seal is ensured between the metallic housing and the electrode by coating the metallic housing with ceramic in the portion near the electrode. A gap between the metallic housing and the electrode is sealed by the metallic sealing material.

In the third aspect of the invention, the electrode is coated with ceramic in the portion near the metallic housing so as to ensure a good insulating seal between the metallic housing and the electrode. A gap between the metallic housing and the electrode is sealed by the metallic sealing material similarly to the second aspect of the invention.

In the present invention, a metallic sealing material is positioned between members, for example, an electrode and an insulating member. The metallic sealing material is pressed to be transformed so that gas sealability is ensured. A metallic sealing material is preferably a soft metal which easily transforms and matches the gap between members. When the material is used at a high temperature and in a corrosive environment such as an exhaust system of an automobile, the metallic sealing material is required to have a certain heat resistance, corrosion resistance, etc. Therefore, in such a case, a desirable metallic sealing material is a metallic ring having heat resistance and corrosion resistance, for example, a stainless steel (SUS), with copper plating on its surface because copper plating makes the ting match the members. In this case, because the plated copper is not exposed to the air, sealability is secured without oxidation or scattering even at a high temperature and in a corrosive environment.

As an electrode, a metallic bolt is suitably used. The bolt is inserted into a hole formed in the metallic housing and/or a holder attached to the metallic housing by means of welding or the like. Then, the bolt is held in its place with a nut so that the bolt is fixed to the metallic housing with an insulating members and a metallic sealing material being interposed. The internal end of the metallic bolt in the metallic housing is connected to a portion of a conductible substance installed in a metallic housing directly or by means of a metallic connecting member.

The insulating member is required not only to have an insulating property but also to have sufficient strength to endure the force generated by fastening the nut. For example, the insulating member desirably resists a fastening force of 50 kgf. Specifically, an insulating material made of alumina, ceramics or the like can be used.

Preferably a member having a function of a spring such as a spring washer, belleville spring or the like is positioned in any place between metallic members and insulating members constituting a structure of an electrode unit so as to absorb a difference in thermal expansion between the metallic and insulating members and prevent a gas from leaking, which would otherwise occur by the difference in thermal expansion. In this case, the member having a function of a spring is preferably made of stainless steel so as to prevent the member from losing the function of a spring at a high temperature.

As a conductible substance, a metallic honeycomb structure is typical. In this case, the present invention is a structure of an electrode unit for an electrically heated catalyst for purifying an automobile exhaust gas or the like. Besides a metallic honeycomb structure, various kinds of conductible substances can be used. The present invention has a structure of an electrode unit for applying electricity to a conductible substance installed in a metallic housing and can be applied, as a structure of an electrode unit, to any kind of apparatus, etc., requiring a good insulating and/or gas seal between a metallic housing and an electrode.

DETAILED DESCRIPTION OF THE INVENTION

The present invention is hereinbelow described in more detail with reference to embodiments shown in the attached drawings. However, the present invention is not limited to these embodiments.

Each of FIGS. 1–6 is a partial explanatory view showing an embodiment of a structure of an electrode unit 1 of the present invention. In the FIGS. 2, 4, and 6 denote a metallic housing, a conductible substance having a metallic honeycomb structure, and an electrode consisting of a metallic bolt, respectively. 8 and 8' denote insulating members. 10, 10', and 10" denote a metallic sealing material made of a metallic ring on which copper is plated. 12, 14, 16, and 18 denote a spring washer, a nut, a metallic connecting member, and a washer.

Figure 1:
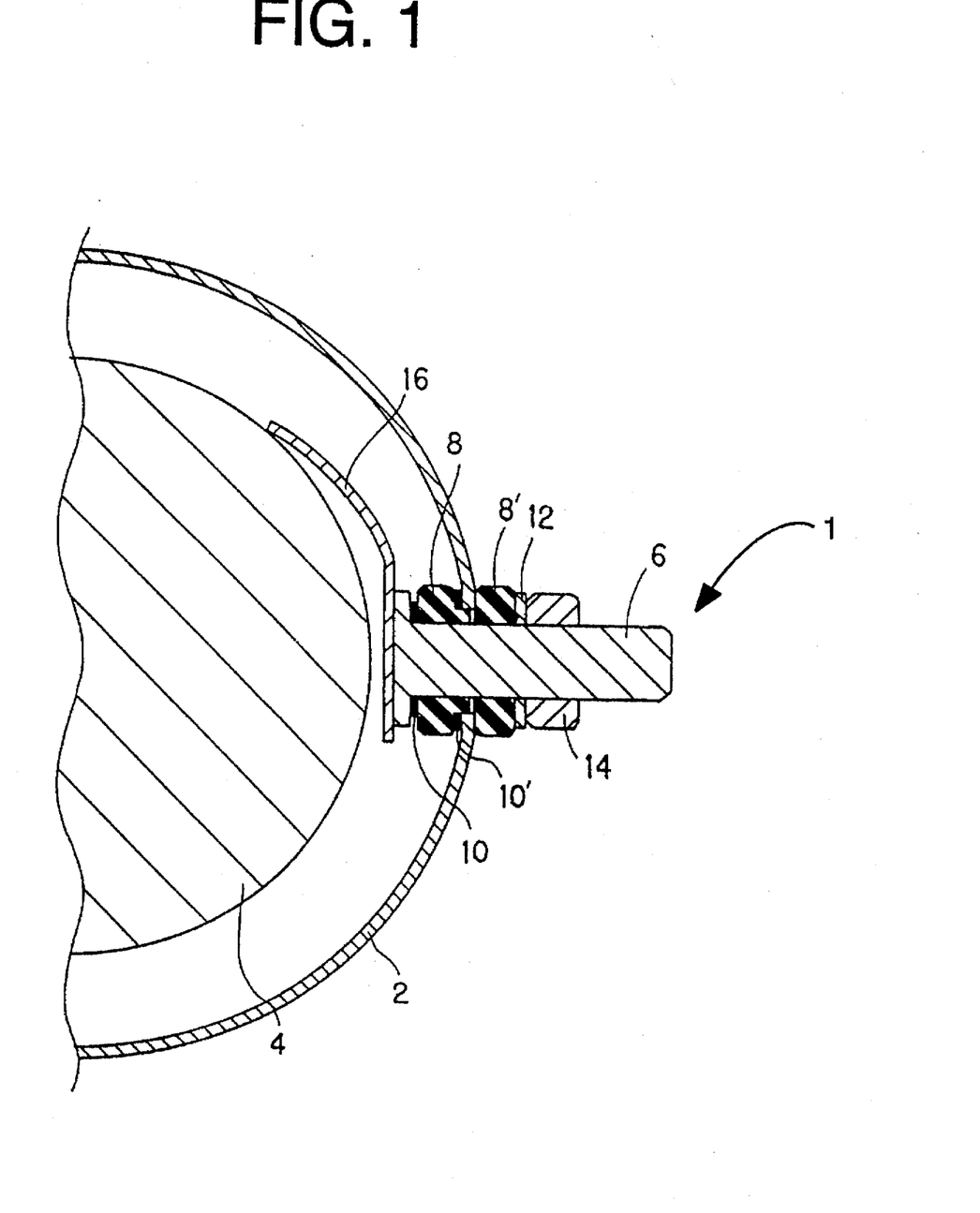
FIG. 1 is a partial explanatory view showing the first embodiment of a structure of an electrode unit of the present invention.

In the structure of an electrode unit 1 shown in FIG. 1, an electrode 6 is inserted into a hole provided in a metallic housing 2. The electrode 6 is fixed to a metallic housing 2 by fastening a nut 14 with insulating members 8 and 8' being interposed between the nut 14 and internal end of the electrode 6. Metallic sealing materials 10 and 10' are positioned between the electrode 6 and the insulating member 8 and between the metallic housing 2 and an insulating member 8 respectively. The metallic sealing materials 10 and 10' are transformed so as to secure sealability when the nut 14 is fastened. On the other hand, a spring washer 12 is interposed between the insulating member 8' and a nut 14 so as to absorb the difference in thermal expansion between the metallic member and the insulating member and prevent sealability from deteriorating. The internal end of the electrode 6 in the metallic housing 2 is connected to a portion of the conductible substance 4 by means of the metallic connecting member 16.

This structure of an electrode unit 1 has a small number of parts. Further, because the metallic sealing material 10 is disposed in the base side of the electrode 6, the electrode is not prone to be directly exposed to a gas having a high temperature, for example an exhaust gas passing through the metallic housing 2. Therefore, the temperature of the electrode 6 hardly rises.

Figure 2:
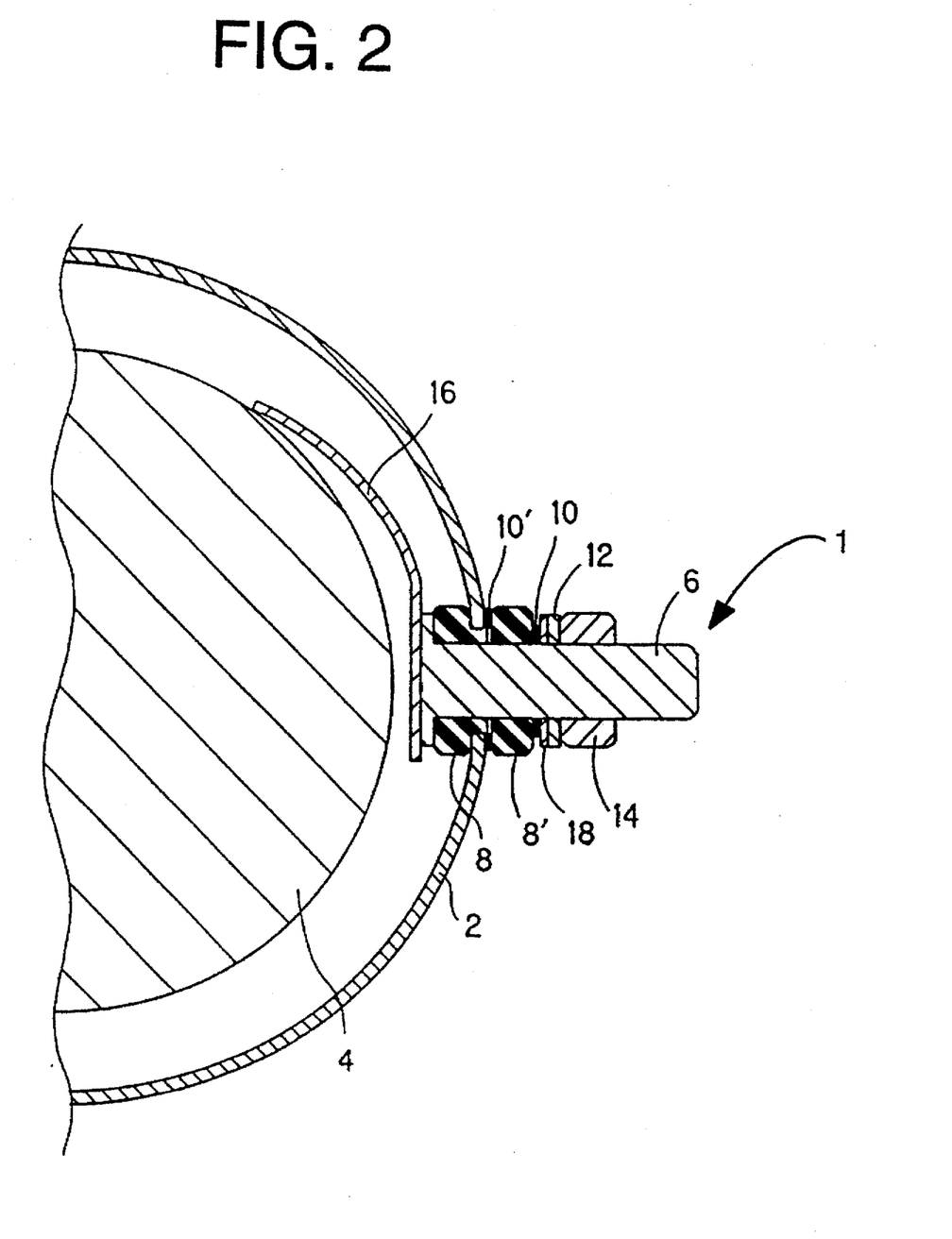
FIG. 2 is a partial explanatory view showing the second embodiment of a structure of an electrode unit of the present invention.

The structure of an electrode unit 1 shown in FIG. 2 has a constitution similar to that in FIG. 1 except that both a metallic sealing material 10 positioned between the electrode 6 and the insulating member 8' and a metallic sealing material 10' positioned between the metallic housing 2 and the insulating member 8' are disposed outside of the metallic housing.

Because of this structure, durability of a metallic sealing material improves because the metallic sealing material is exposed to a lesser amount of gas.

Figure 3:
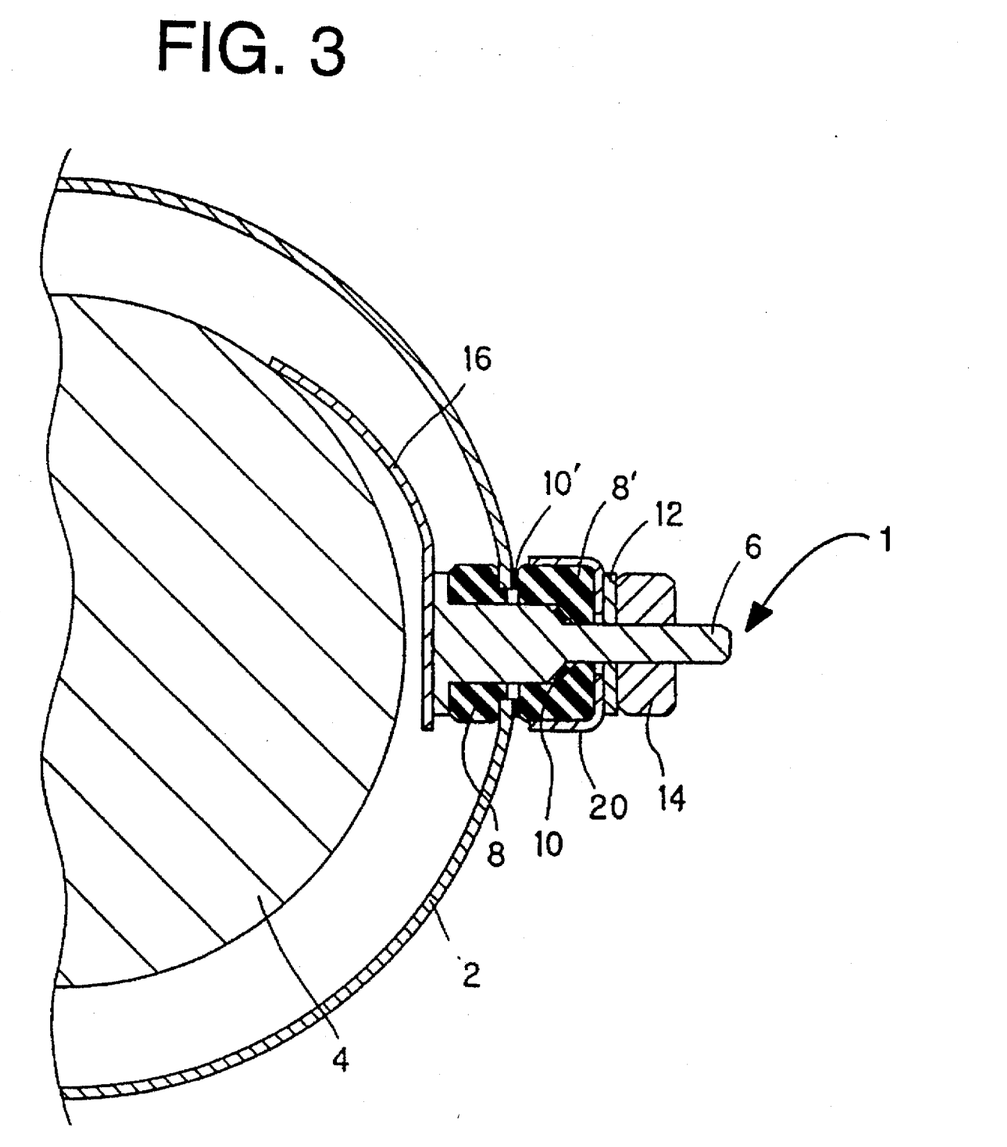
FIG. 3 a partial explanatory view showing the third embodiment of a structure of an electrode unit of the present invention.

In the structure of an electrode unit 1 shown in FIG. 3, the electrode 6 has a tapered portion so as to improve sealability, and the metallic sealing material 10 is disposed in the tapered portion so as to secure sealability between the electrode 6 and the insulating member 8'. The structure also has a metallic protective cover 20 in order to cover the insulating member 8'.

In this structure of an electrode unit 1, the insulating member 8 is prevented from being damaged because a stone or the like does not hit the insulating member 8 directly because of the protective cover 20.

Figure 4:
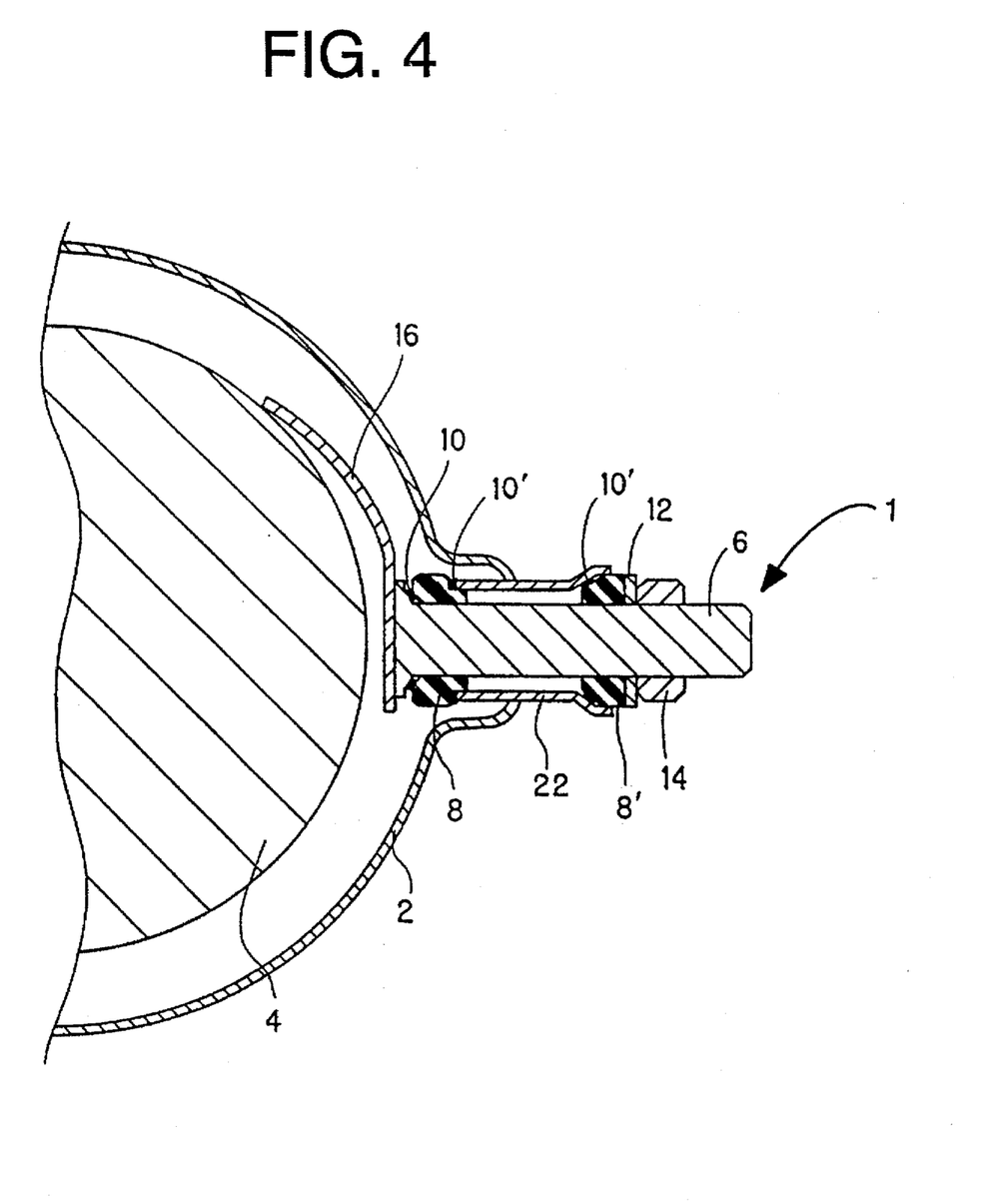
FIG. 4 is a partial explanatory view showing the fourth embodiment of a structure of an electrode unit of the present invention.

FIG. 4 shows a structure of an electrode unit 1, in which an electrode 6 is fixed to the metallic housing 2 by a holder 22 attached to the metallic housing 2. In this structure, the electrode 6 is first fixed to the holder 22 by fastening a nut 14 with an insulating member 8, 8', a metallic sealing material 10, 10', and a spring washer 12 interposed. Then, the holder 22 is inserted into a hole formed in the metallic housing 2 so that the holder is attached to the metallic housing 2 by welding or the like.

In this structure, since the holder 22 is used, the spring washer 12 is positioned far from the metallic housing, which prevents the spring washer 12 from losing its spring function caused by a high temperature raised by a gas having the high temperature in a metallic housing 2.

Figure 5:
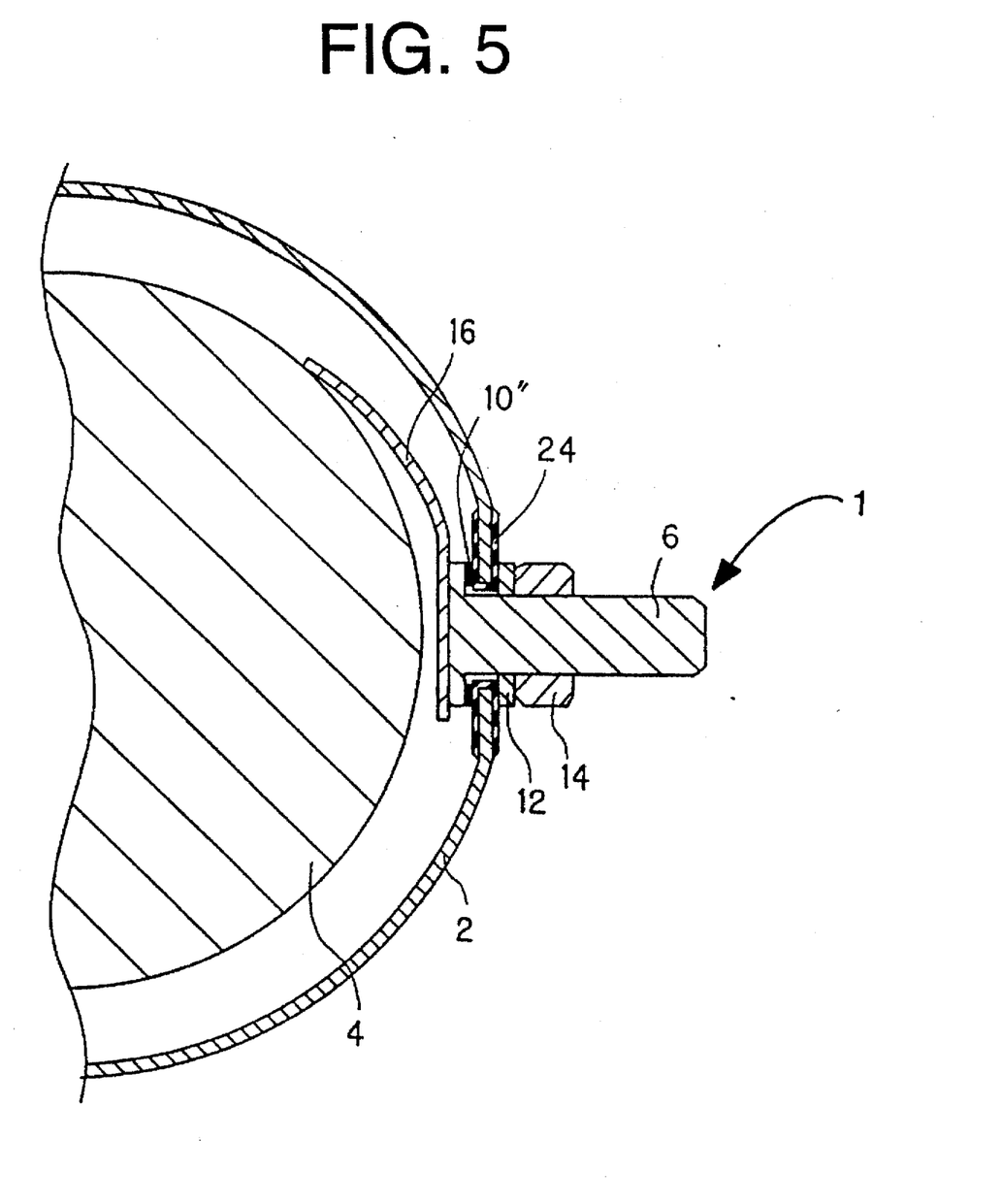
FIG. 5 is a partial explanatory view showing the fifth embodiment of a structure of an electrode unit of the present invention.
Figure 6:
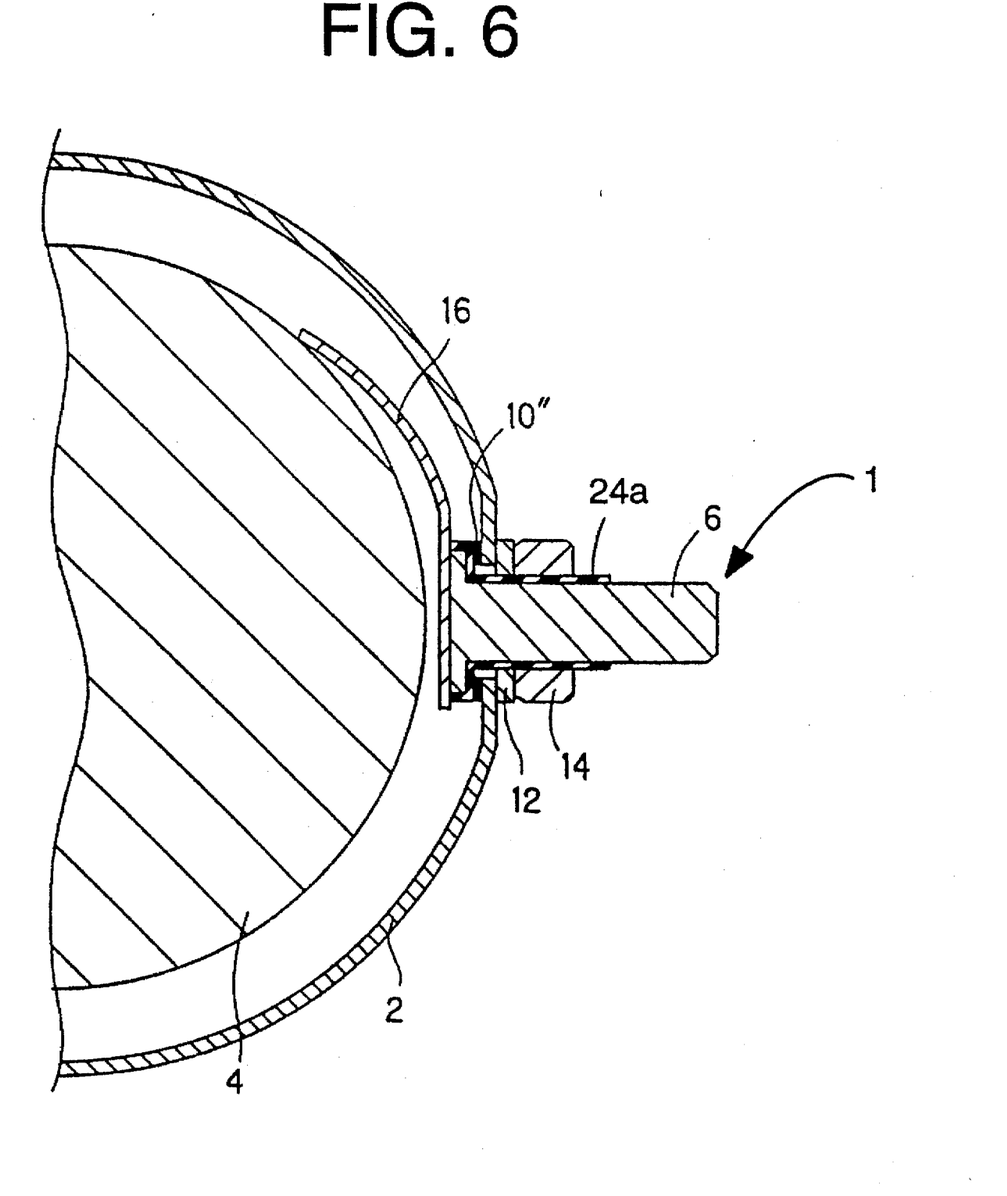
FIG. 6 is a partial explanatory view showing the sixth embodiment of a structure of an electrode unit of the present invention.

In FIG. 5, the metallic housing 2 is coated with ceramic 24 in the portion near the electrode 6 so as to ensure the insulating property between metallic housing 2 and the electrode 6. The gap between the portion 24 of the metallic housing 2 and the electrode 6 is sealed by a metallic sealing material 10". FIG. 6 shows a structure in which an electrode 6 is coated with a ceramic 24 a in the portion near the metallic housing 2 instead of using an insulating member.

In these structures, the ceramic coating to a portion of the metallic housing 2 or the electrode 6 makes an insulating member unnecessary, resulting in reducing the number of parts and improving composability.

EXAMPLE

The electrode unit 1 shown in FIG. 4 was subjected to a cool/heat cycle test and a moisture absorption test described below. The conventional structure of an electrode unit using a cement sealing material shown in FIG. 7 was also subjected to a moisture absorption test as a comparative example.

In each of the structures in FIG. 4 (example) and FIG. 7 (comparative example), the following were used a bolt of M10×1.5 (outer diameter: 10 mm, pitch: 1.5 mm) having a length of 60 mm made of AISI310S as an electrode 6, a can having an inner diameter of 102 mm and a thickness of 1.5 mm made of AISI310S as a metallic housing 2, a metallic honeycomb structure ( shape of cell: hexagon, thickness of walk 4 mil, cell density: 450 cell/inch$^2$) having an outer diameter of 92 mm, a width of 50 mm, and a composition of Fe—16Cr—8Al as a conductible material 4, and an alumina insulator as an insulating member 8, 8'. Further, as a metallic sealing material 10 and 10', a ring made of SUS with copper plated thereon was used. The holder 22 in FIG. 4 and the holder 26 in FIG. 5, both of which were made of the same material as the metallic housing 2, were fixed to a metallic housing 2 by welding.

Figure 8:
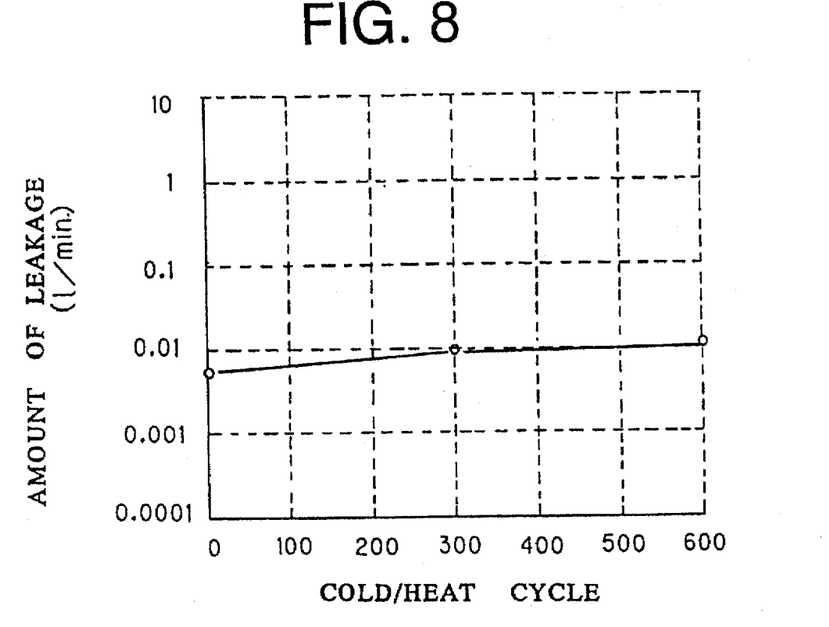
FIG. 8 is a graph showing results of cold/heat cycle test.

Cool/heat cycle test:

The electrode unit shown in FIG. 4 was heated at 600° C. for 8.5 minutes in a furnace. Then, the electrode unit was taken out of the furnace and cooled down to room temperature for 5 minutes by a fun. This heating and cooling were repeated 600 times and leakage was measured. The results are shown in FIG. 8. The electrode unit showed a high sealability of about 0.01 l/min even in the 600th cycle.

Figure 9:
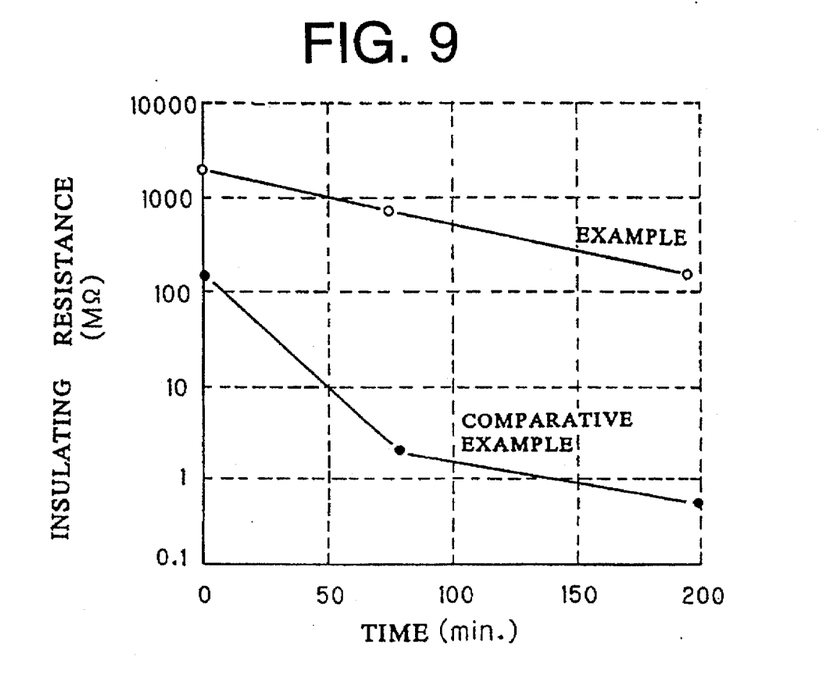
FIG. 9 is a graph showing results of a moisture absorption test.

Moisture absorption test:

The electrode units were kept at room temperature with 100% of humidity. The insulating resistance of each unit was measured for 200 minutes from the beginning. The results are shown in FIG. 9. The electrode unit in Example maintained high insulating resistance of 100 MΩ or more for 200 minutes from the beginning, while the insulating resistance of the electrode unit in the Comparative Example decreased especially in the first stage of the test, and the resistance decreased to 1 MΩ when 200 minutes passed.

As described above, according to the present invention, there is provided a structure of an electrode unit for applying electricity to a conductible substance installed in a metallic housing. The present electrode unit structure is excellent in insulating property between an electrode and a metallic housing, in gas sealability and has high reliability. The present invention can be suitably used as a structure of an electrode unit of an electrical heater which is used in a catalytic converter for purifying an exhaust gas of an automobile or the like.

What is claimed is:

1. An electrode unit structure for applying electricity to a conductive substance provided in a metallic housing, comprising:

a metallic housing;

a metallic electrode for connection to a portion of a conductive substance provided in the metallic housing;

an insulating member provided between the electrode and the metallic housing;

metallic seals respectively provided between the electrode and the insulating member and between the metallic housing and the insulating member;

clamping means for providing a clamping force to secure the electrode to the metallic housing, said clamping means comprising a metallic member engaging the metallic electrode; and a spring member provided between the metallic member and the insulating member to absorb a difference in thermal expansion between the metallic member and the insulating member.

2. The structure of claim 1, wherein the electrode is threaded, and the metallic member comprises a nut that threadingly engages the threads of the electrode.

3. The structure of claim 1, wherein said insulating member comprises first and second opposing insulating elements that are clamped onto opposing portions of the metallic housing.

4. The structure of claim 1, wherein the electrode is fixed to the metallic housing via a fixing holder.

5. The structure of claim 1, wherein the conductive substance is a metallic honeycomb structure.

6. The structure of claim 1, wherein each metallic seal comprises at least one metallic ring plated with copper on a surface thereof.

7. An electrode unit structure for applying electricity to a conductive substance provided in a metallic housing, comprising:

a metallic housing;

a metallic electrode for connection to a portion of the conductive substance provided in the metallic housing, the metallic housing being coated with a ceramic material along a portion thereof near the electrode;

a metallic sealing material providing a seal between the metallic housing and the electrode;

clamping means for providing a clamping force to secure the electrode to the metallic housing, said clamping means comprising a metallic member engaging the metallic electrode; and a spring member provided between the metallic member and the insulating member to absorb a difference in thermal expansion between the metallic member and the insulating member.

8. The structure of claim 7, wherein the electrode is threaded, and the metallic member comprises a nut that threadingly engages the threads of the electrode.

9. The structure of claim 7, wherein the ceramic material is coated around a peripheral portion of a hole in the metallic housing through which the electrode extends.

10. The structure of claim 9, wherein said electrode is clamped onto said peripheral portion of said metallic housing.

11. The structure of claim 7, wherein said conductive substance is a metallic honeycomb structure.

12. The structure of claim 7, wherein said sealing material comprises at least one metallic ring having copper plated on a surface thereof.

13. An electrode unit structure for applying electricity to a conductive substance provided in a metallic housing, comprising:

a metallic housing;

a metallic electrode for connection to a conductive substance provided in the metallic housing, the electrode being coated with a ceramic material along a portion thereof near the metallic housing;

a metallic sealing material providing a seal between the metallic housing and the electrode;

clamping means for providing a clamping force to secure the electrode to the metallic housing, said clamping means comprising a metallic member engaging the metallic electrode; and a spring member provided between the metallic member and the insulating member to absorb a difference in thermal expansion between the metallic member and the insulating member.

14. The structure of claim 13, wherein the metallic sealing material is provided between the portion of the electrode coated with ceramic material and the metallic housing.

15. The structure claim 13, wherein the conductive substance comprises at least one metallic ring having copper plated along a surface thereof.

16. The structure of claim 13, wherein the electrode is threaded, and the metallic member comprises a nut that threadingly engages the threads of the electrode.

* * * * *